(12) United States Patent
Urmanov et al.

(10) Patent No.: US 10,956,543 B2
(45) Date of Patent: Mar. 23, 2021

(54) SYSTEM AND METHOD FOR PROTECTING ONLINE RESOURCES AGAINST GUIDED USERNAME GUESSING ATTACKS

(71) Applicant: Oracle International Corporation, Redwood Shores, CA (US)

(72) Inventors: Aleksey M. Urmanov, San Diego, CA (US); Alan Paul Wood, San Jose, CA (US); Anton A. Bougaev, La Jolla, CA (US)

(73) Assignee: Oracle International Corporation, Redwood Shores, CA (US)

( * ) Notice: Subject to any disclaimer, the term of this patent is extended or adjusted under 35 U.S.C. 154(b) by 318 days.

(21) Appl. No.: 16/011,049

(22) Filed: Jun. 18, 2018

(65) Prior Publication Data
US 2019/0384897 A1 Dec. 19, 2019

(51) Int. Cl.
G06F 21/31 (2013.01)
H04L 29/06 (2006.01)
G06F 21/45 (2013.01)

(52) U.S. Cl.
CPC .......... G06F 21/316 (2013.01); G06F 21/45 (2013.01); H04L 63/083 (2013.01); H04L 63/0815 (2013.01); H04L 63/0876 (2013.01)

(58) Field of Classification Search
CPC ... G06F 21/316; G06F 21/45; H04L 63/0815; H04L 63/083; H04L 63/0876
See application file for complete search history.

(56) References Cited

U.S. PATENT DOCUMENTS

| | | | |
|---|---|---|---|
| 7,475,252 B2 | 1/2009 | Jeffries et al. | |
| 8,127,353 B2 | 2/2012 | Rittermann | |
| 8,272,033 B2 | 9/2012 | Wasmund | |
| 8,490,162 B1 | 7/2013 | Popoveniuc et al. | |
| 8,533,821 B2 | 9/2013 | Crume | |

(Continued)

OTHER PUBLICATIONS

PasswordPing: "Block Attacks From Compromised Credentials"—PasswordPing Downloaded from https://www.passwordping.com/ on May 9, 2018.

*Primary Examiner* — Ali S Abyaneh
*Assistant Examiner* — Shu Chun Gao
(74) *Attorney, Agent, or Firm* — Park, Vaughan, Fleming & Dowler LLP

(57) ABSTRACT

The system receives a stream of authentication events, which are associated with authentication events. Next, the system attempts to detect a formation of authentication events, wherein a formation comprises a time window of authentication events that satisfy a formation criterion, which is based on one or more of: a username for the authentication attempt, an Internet Protocol (IP) address from which the authentication attempt originated, and a resource identifier for a computing resource that the authentication attempt was directed to. If a formation is detected, the system determines a number of valid usernames in the formation. If the number of valid usernames is one or less, the system computes a username similarity score for authentication events in the formation, which is a function of a string distance between usernames in the formation. If the username similarity score exceeds a threshold value, the system reports a potential username guessing attack.

20 Claims, 5 Drawing Sheets

(56) References Cited

U.S. PATENT DOCUMENTS

| | | | |
|---|---|---|---|
| 8,875,255 B1* | 10/2014 | Dotan | G06F 21/31 |
| | | | 726/5 |
| 9,148,424 B1* | 9/2015 | Yang | H04L 63/308 |
| 9,407,652 B1* | 8/2016 | Kesin | G06N 7/005 |
| 9,525,683 B2 | 12/2016 | Wall | |
| 9,654,508 B2* | 5/2017 | Barton | G06F 9/45533 |
| 9,769,209 B1 | 9/2017 | Graham et al. | |
| 9,843,574 B1* | 12/2017 | Triandopoulos | H04L 9/3226 |
| 10,713,570 B1* | 7/2020 | Hazard | G06N 3/126 |
| 10,891,372 B1* | 1/2021 | Shahbazi | H04L 9/3297 |
| 2002/0112185 A1 | 8/2002 | Hodges | |
| 2005/0071643 A1* | 3/2005 | Moghe | G06F 21/552 |
| | | | 713/182 |
| 2007/0294428 A1* | 12/2007 | Guy | G06Q 10/107 |
| | | | 709/245 |
| 2008/0034412 A1 | 2/2008 | Wahl | |
| 2011/0239281 A1* | 9/2011 | Sovio | H04L 63/0815 |
| | | | 726/5 |
| 2014/0230051 A1 | 8/2014 | Vallinayagam et al. | |
| 2017/0134362 A1 | 5/2017 | Randall et al. | |
| 2019/0166112 A1* | 5/2019 | Gordon | G06F 21/31 |
| 2020/0065475 A1* | 2/2020 | Sharma | H04L 9/3226 |
| 2020/0137110 A1* | 4/2020 | Tyler | H04L 63/145 |
| 2020/0358798 A1* | 11/2020 | Maylor | H04L 63/1416 |

* cited by examiner

SYSTEM AND METHOD FOR PROTECTING ONLINE RESOURCES AGAINST GUIDED USERNAME GUESSING ATTACKS

BACKGROUND

Field

The disclosed embodiments generally relate to techniques for preventing unauthorized accesses to online resources. More specifically, the disclosed embodiments relate to a technique for protecting online resources against username guessing attacks.

Related Art

Online computing resources are typically protected from unauthorized accesses by requiring users to enter usernames and passwords. Despite numerous educational efforts and enforcement of best practices for creating and managing passwords and usernames, users commonly reuse the same password to access different online services and resources. Moreover, users often employ an easily guessable password. While brute force password guessing attacks are easily detectable by the existing security systems, more subtle "slow-developing" password guessing attacks remain undetectable by the majority of existing security mechanisms.

Even less protection exists against "guided username guessing attacks" in which a human attacker (or a specialized bot) attempts to access accounts of specific individuals for whom additional information is available either publicly or via illegal means (e.g., through data leaks). The attacker exploits a target user's personal information and other accounts belonging to the target user, which may contain compromised passwords, to craft valid username-password combinations to gain unauthorized access to online resources and services belonging to the target user. Unfortunately, data leaks are on the rise, providing attackers with plausible variants of the target user's usernames and passwords, which makes it easier to launch such guided username guessing attacks.

A common defense against such unauthorized accesses is to require multifactor authentication. However, it is usual practice to enable multifactor authentication only for access from public networks, and disable it for accesses from a private network. This opens possibilities for guided username guessing attacks orchestrated by insiders. Moreover, not all services can accommodate multifactor authentication. For example, accesses to an email account via a web browser may be protected by multifactor authentication. However, accesses to an email account via the IMAP protocol by a valid email client (or by an email client imitator) may not be protected by multifactor authentication. In such situations, guided username guessing attacks from outside or inside of the company network can be carried out unnoticed, even in the presence of multifactor authentication.

Hence, what is needed is a technique for detecting guided username guessing attacks as early as possible to prevent unauthorized accesses to online resources.

SUMMARY

The disclosed embodiments provide a system that detects a username guessing attack. During operation, the system receives a stream of authentication events, wherein each authentication event in the stream represents an authentication attempt directed to a computing resource. Next, the system attempts to detect a formation of authentication events in the stream of authentication events, wherein a formation comprises a time window of authentication events that satisfy a formation criterion, which is based on one or more of the following: a username for the authentication attempt, an Internet Protocol (IP) address from which the authentication attempt originated, and a resource identifier for a computing resource that the authentication attempt was directed to. If a formation is detected, the system determines a number of valid usernames in the formation. Next, if the number of valid usernames is one or less, the system computes a username similarity score for authentication events in the formation, wherein the username similarity score is a function of a string distance between usernames in the formation. If the username similarity score exceeds a threshold value, the system reports a potential username guessing attack.

In some embodiments, the formation criterion includes one or more of the following: a number of authentication events in the formation originate from a new IP address, and are associated with different usernames; and a number of authentication events in the formation are directed to a common computing resource.

In some embodiments, when the username similarity score exceeds a threshold value, in addition to reporting the potential username guessing attack, the system additionally enforces a second authentication factor for an account associated with the formation.

In some embodiments, each authentication event in the stream of authentication events is represented by a data structure, which includes at least one or more of the following attributes: a username for the authentication attempt; an IP address from which the authentication attempt originated; a resource identifier for a computing resource that the authentication attempt was directed to; a status of the authentication attempt; and a time of the authentication attempt.

In some embodiments, when the number of valid usernames is greater than one, the system performs a clustering operation to divide the formation into two or more clusters containing authentication events having similar usernames. Next, for each of the two or more clusters, the system computes a username similarity score for authentication events in the cluster. If the username similarity score exceeds a threshold value, the system reports a potential username guessing attack.

In some embodiments, performing the clustering operation involves using tri-point clustering.

In some embodiments, the system is part of an authentication mechanism in a single sign-on system, which facilitates authentication for multiple computational resources.

In some embodiments, while receiving the stream of authentication events, the system converts each authentication event in the stream into a rule comprising attribute-value pairs.

In some embodiments, after each authentication event is converted into a rule, the system stores the rule in a rules database.

In some embodiments, the system includes one or more formation detectors that execute in parallel while attempting to detect the formation of authentication events, and performing other operations to detect a username guessing attack.

Table 1 illustrates a sequence of rules in accordance with the disclosed embodiments.

Table 2 illustrates two rule sets associated with two usernames in accordance with the disclosed embodiments.

Table 3 illustrates a table of rule firing times in accordance with the disclosed embodiments.

DETAILED DESCRIPTION

The following description is presented to enable any person skilled in the art to make and use the present embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present embodiments. Thus, the present embodiments are not limited to the embodiments shown, but are to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium. Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

Discussion

Figure 1:
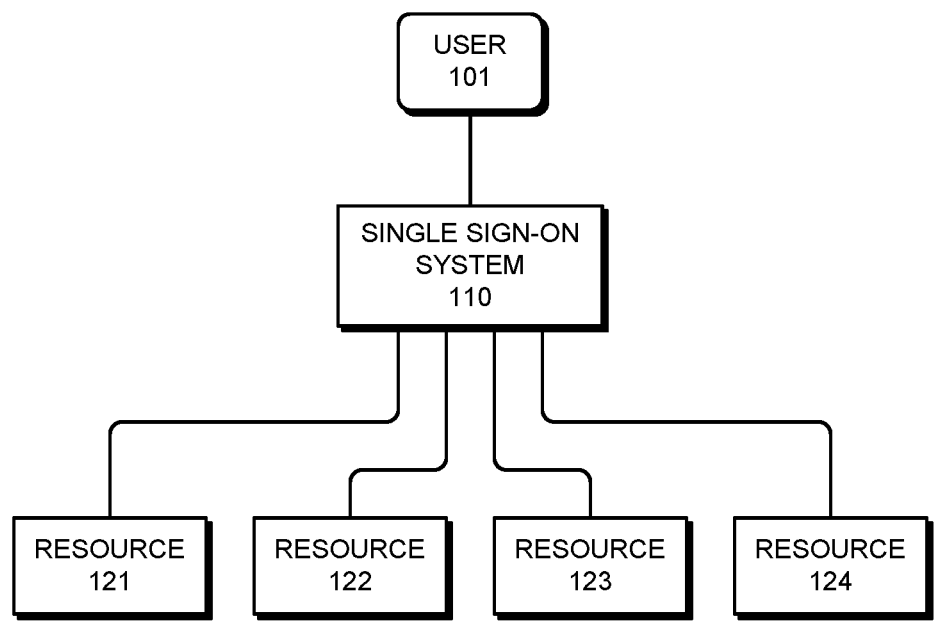
FIG. 1 illustrates a single sign-on system in accordance with the disclosed embodiments.

The disclosed guided username guessing detection technique can generally be employed in any system that performs authentication operations based on usernames and passwords to restrict access to a computing resource. In some embodiments, the technique is employed to provide authentication for a user 101, who is accessing resources 121-124 through single sign-on (SSO) system 110 as is illustrated in FIG. 1. By logging in through SSO system 110 once, user 101 is able to access all of computing resources 121-124 without having to separately log into each computing resource.

During operation, the system receives a stream of authentication events, wherein each authentication event represents an authentication attempt by a user. Note that the entity attempting to authenticate may be a valid user with genuine, possibly mistyped or outdated, credentials, or a malicious actor with stolen or otherwise illegally obtained credentials, or with partially known credentials of a valid or guessed user. At this initial stage, the system makes no distinction between the entities making the authentication attempts and relies on further analysis to infer the authenticity of the authentication attempts.

Each authentication event is represented by a data structure with attribute-value pairs, which includes but is not limited to the following attributes: a username, a client IP address, a resource name, an authentication status and a time of the attempt. The authentication events can then be stored in a database for further analysis. In some embodiments, the authentication events trigger the creation of rules that are stored in a "rules database," wherein each rule comprises a set of "domains," and each domain has two fields: one for attribute name, and one for attribute value. These domains are connected by the "AND" operator. The time field for the authentication event represents the corresponding rule's firing time. Note that one rule can be used to represent all authentication events, which originate from the same user, use the same IP address, and request access to a specific computing resource.

The entire authentication history of a user can be represented by a rule set comprising rules corresponding to the user's authentication attempts. For example, given the authentication events for users UA and UB, which appear in Table 1,

TABLE 1

A(time=t1;username=UA;address=IP1;resource=R1;status=S)
A(time=t2;username=UA;address=IP1;resource=R1;status=S)
A(time=t3;username=UB;address=IP3;resource=R2;status=S)
A(time=t4;username=UA;address=IP2;resource=R1;status=S)
A(time=t5;username=UB;address=IP3;resource=R2;status=F)
A(time=t6;username=UB;address=IP3;resource=R2;status=F)
A(time=t7;username=UB;address=IP3;resource=R2;status=S)
A(time=t8;username=UA;address=IP2;resource=R1;status=S)
A(time=t9;username=UB;address=IP3;resource=R3;status=S)

the system will produce two rule sets corresponding to the two distinct usernames as is illustrated in Table 2.

TABLE 2

RS(UA):
  rule1 = [address=IP1]:[resource=R1]:[status=S]
  rule2 = [address=IP2]:[resource=R1]:[status=S]
RS(UB):
  rule3 = [address=IP3]:[resource=R2]:[status=S]
  rule4 = [address=IP3]:[resource=R2]:[status=F]
  rule5 = [address=IP3]:[resource=R2]:[status=S]
  rule6 = [address=IP3]:[resource=R3]:[status=S]

Note that Rules 1-2 describe the authentication history of user UA, and rules 3-6 describe the authentication history of user UB.

The system will produces a table of rule firing times as is illustrated in Table 3.

TABLE 3

FIRED:
rule1,t1
rule1,t2
rule3,t3
rule2,t4
rule4,t5
rule4,t6
rule5,t7
rule2,t8
rule6,t9

This table of firing times keeps the timestamp of each authentication attempt whose attributes are represented by a corresponding rule in the rule sets.

The table of rule sets and the table of rule firing times compactly represent the entire authentication history, which is derived from the incoming authentication events. Note that these tables may store the entire authentication history, or alternatively a rolling window, for example, representing the last two month's worth of authentication events.

Other representations of events can be used. For example, each rule may have a hash code associated with it, which is computed from the values of its domains. This hash code can be used as an index to avoid full table scans, thereby speeding up rule lookups in large databases.

The system further deploys a set of formation detectors, which are autonomous workers that obtain a task description from a central job distribution unit. This task description provides a desired formation specification for a formation detector. The formation detectors then search the rules database for patterns matching their formation specifications.

In one embodiment, the formation specification includes the following parameters: a first timestamp, a second timestamp, a minimum formation size, a type of the IP address, an IP address novelty flag, an IP novelty percentage, a same resource flag, a same resource percentage, and a user behavior change flag. The first timestamp specifies the most recent time of an authentication attempt that can be put in a formation. The second timestamp specifies the most distant time of an authentication attempt that can be put in a formation. (For example, the first timestamp can be set to the current time, and the second timestamp can be set to the current time—24 hours). The minimum formation size limits the minimum size of a reported formation. (For example, the minimum formation can be set to three.) The type of the IP address is used to distinguish between private and public IP addresses. The address novelty flag specifies whether a corresponding IP is being used for first time by the members of a formation. The IP novelty percentage specifies the percentage of members of a formation, which are using an IP address for the first time. The same resource flag specifies that the same resource is being accessed by members of a formation. The same resource percentage specifies the percentage of members of a formation that use the same resource. The user behavior change flag specifies whether the authentication behavior of the members of a formation has changed during the time frame of interest. In one variation, the formation specification includes an additional flag indicating formations that are built around a common resource instead of a common IP address.

Figure 4:
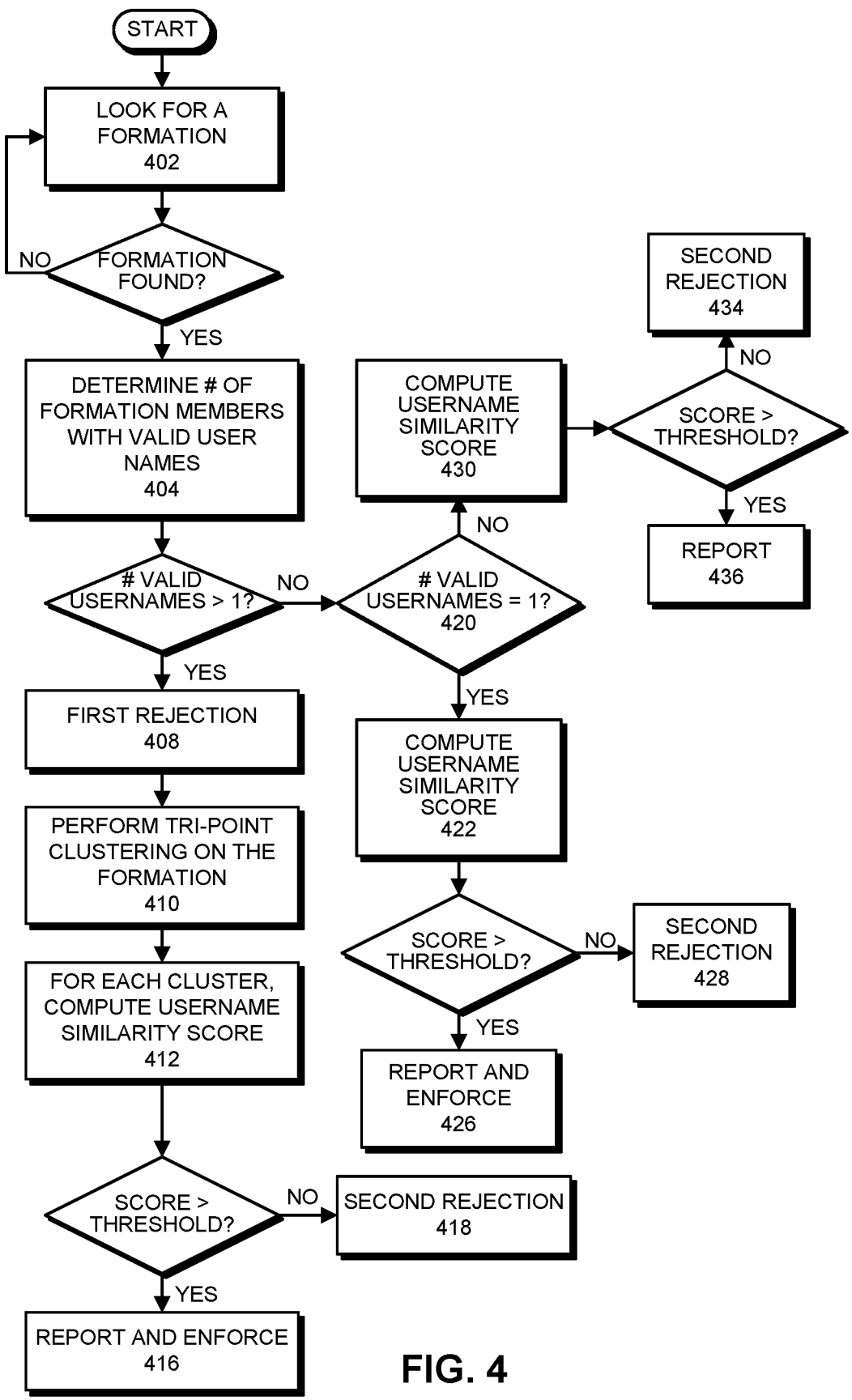
FIG. 4 presents a detailed flow chart illustrating operations performed while attempting to detect guided username guessing attacks in accordance with the disclosed embodiments.

We now describe the operation of the system with reference to the flow chart that appears in FIG. 4. During operation, the formation detectors look for a formation (step 402); this involves attempting to detect patterns in the rules database that fit corresponding formation specifications. If a formation is not found, the system returns to step 402. Otherwise, if a formation is detected at step 402, the system processes the formation to extract indicators of a guided username guessing attack. During this process, the system analyzes the formation in several stages. In a first stage, all usernames in the formation are validated against a current username directory to determine the number of formation members with valid usernames (step 404). If there exist two or more valid usernames, the formation is rejected. This is a first rejection (step 408).

On the other hand, if none of the formation members has a valid username, the system checks if at least one formation member has a close match to a valid username. If so, this indicates a guided username guessing attack, and the system further analyzes the formation by computing a username similarity score (step 430), which measures differences among usernames of formation members. For example, a pairwise edit distance can be computed among usernames for all pairs or members in the formation, and the minimum, average and maximum of such edit distances can be computed. Note that a number of different "string distance" metrics can be used as the edit distance, such as the Levenshtein distance, or a custom string distance, which is engineered to measure the differences among variations of the same username. The computed statistics then are converted into the username similarity score, which indicates how likely it is that a set of usernames represents variations of the same username. If the similarity score exceeds the threshold, the system reports the cluster as possibly containing a username guessing attack (step 436). If the similarity score does not exceed the threshold, it is likely that a legitimate user has simply mistyped their username, and the formation is rejected as being associated with a username guessing attack. This is a second rejection (step 434).

If only one member of the formation has a valid username, the system also computes a username similarity score (step 422). If the username similarity score exceeds a threshold, the system reports the cluster as possibly being involved in a username guessing attack and can also enforce a second factor authentication (step 426). If the second factor authentication is successful, the corresponding formation is cleared. On the other hand, if the score does not exceed the threshold, a second rejection takes place (step 428).

Formations that are subject to a first rejection are further analyzed to extract indicators of a guided username guessing attack involving more than one username. This can involve performing a tri-point clustering technique on the formation (step 410) based on members' usernames to divide the formation into clusters associated with different usernames. (See U.S. Pat. No. 9,514,213, entitled "Per-Attribute Data Clustering Using Tri-Point Data Arbitration," by inventors Alan Paul Wood, et al., filed on 15 Mar. 2013, which is hereby incorporated herein by reference.) Each resulting cluster contains members that have similar usernames, which are potentially variations of the same username. The resulting clusters are then analyzed for indicators of a guided username guessing attack. For each cluster, this involves computing a username similarity score (step 412). If the score exceeds a threshold, the system reports the cluster as possibly being involved in a username guessing attack, and can also enforce a second factor authentication (step 416). If the second factor authentication is successful, the corresponding formation is cleared. On the other hand, if the score does not exceed the threshold, a second rejection takes place (step 418).

Formations that are not rejected can be reported as potential threats. The system can also enforce a second factor authentication. If the second factor authentication is successful, the corresponding formation is cleared.

Figure 2:
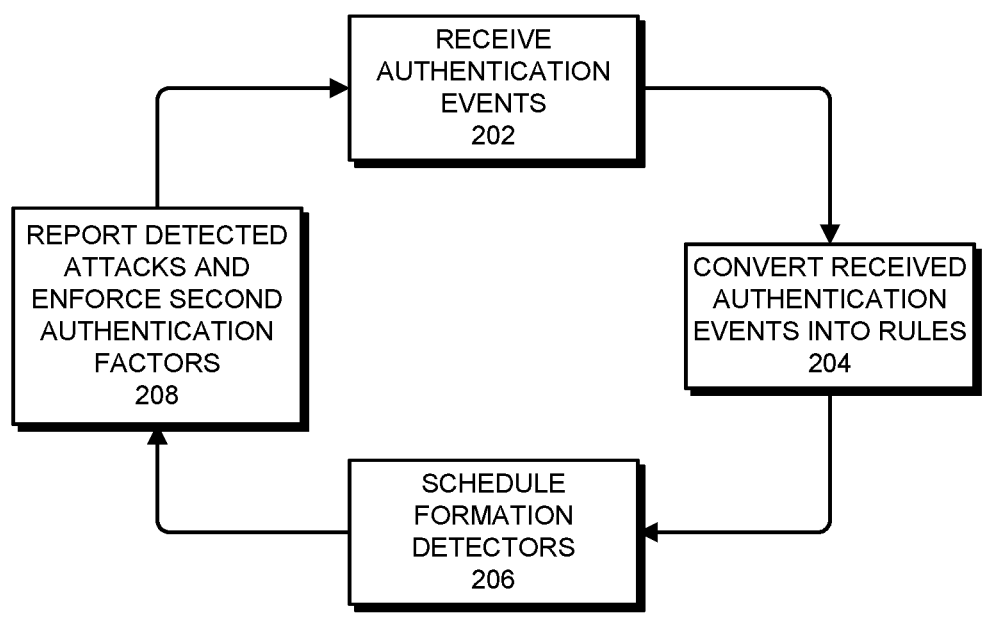
FIG. 2 presents a flow chart illustrating an overall system workflow involved in detecting guided username guessing attacks in accordance with the disclosed embodiments.

FIG. 2 presents a flow chart illustrating an overall system workflow involved in detecting guided username guessing attacks in accordance with the disclosed embodiments. During operation, the system receives authentication events 202, and converts the received authentication events into rules (step 204). Next, the system schedules formation detectors (step 206), wherein the formation detectors execute to detect username guessing attacks. Finally, the system reports detected attacks and enforces second authentication factors as necessary (step 208).

Figure 3:
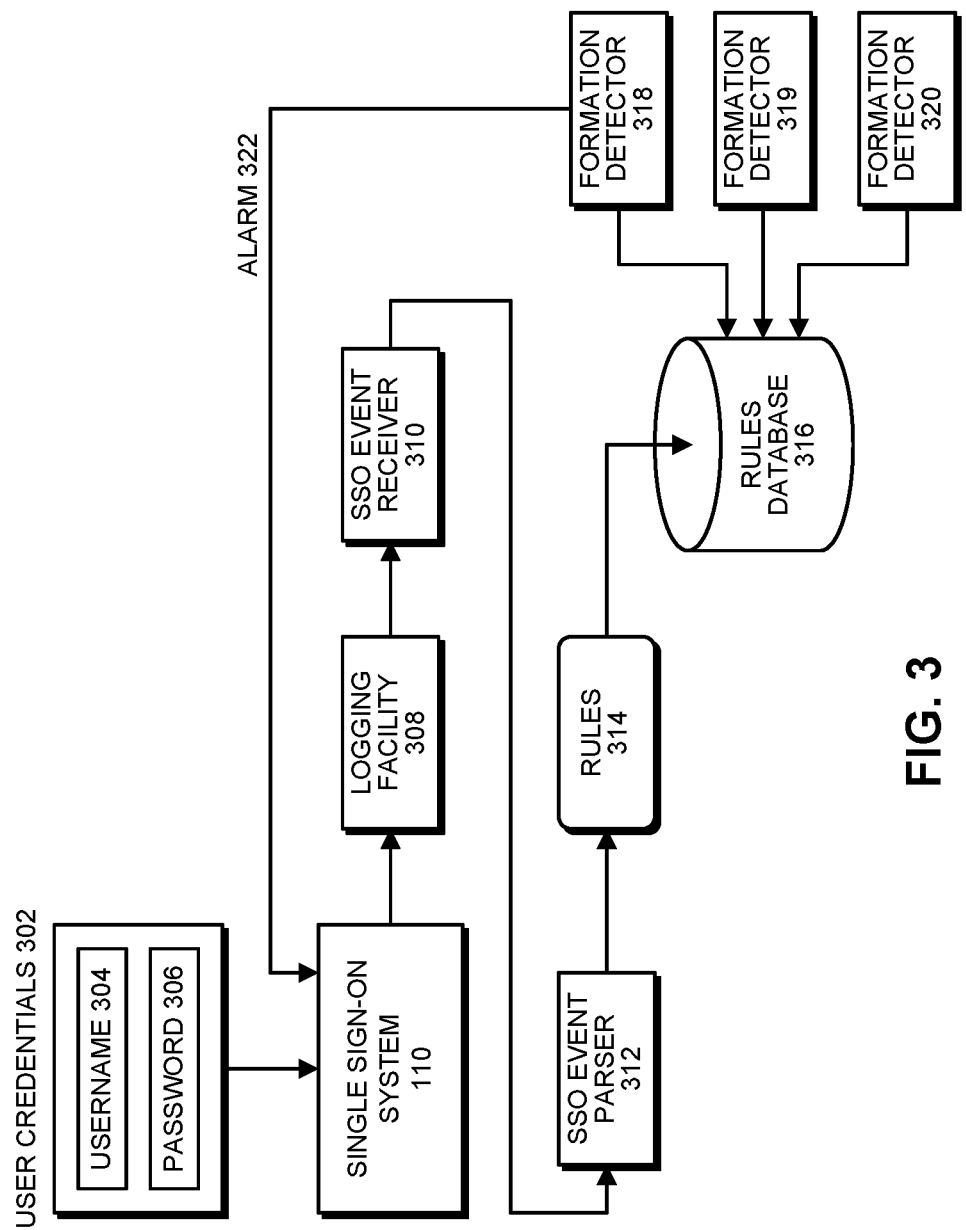
FIG. 3 illustrates various system components involved in detecting guided username guessing attacks in accordance with the disclosed embodiments.

FIG. 3 illustrates various system components involved in detecting username guessing attacks in accordance with the disclosed embodiments. During operation, a user provides user credentials 302, which include a username 304 and a password 306, to single sign-on system 110. This information is logged into a logging facility 308, which can be implemented using a large redundant database. The logs then pass through an SSO event receiver 310 and then through an SSO event parser 312, which converts raw low-level logs into rules 314. The rules 314 are then stored in a rules database 316. Next, a number of formation detectors 318-320, which can run in parallel on different client servers, access rules database 316 and attempt to detect and analyze formations of events. If a potential username guessing attack is detected, the system issues alarms, such as alarm 322. These alarms can be directed back to SSO system 110, and can possibly be sent to a system administrator.

Process of Detecting Username Guessing Attacks

Figure 5:
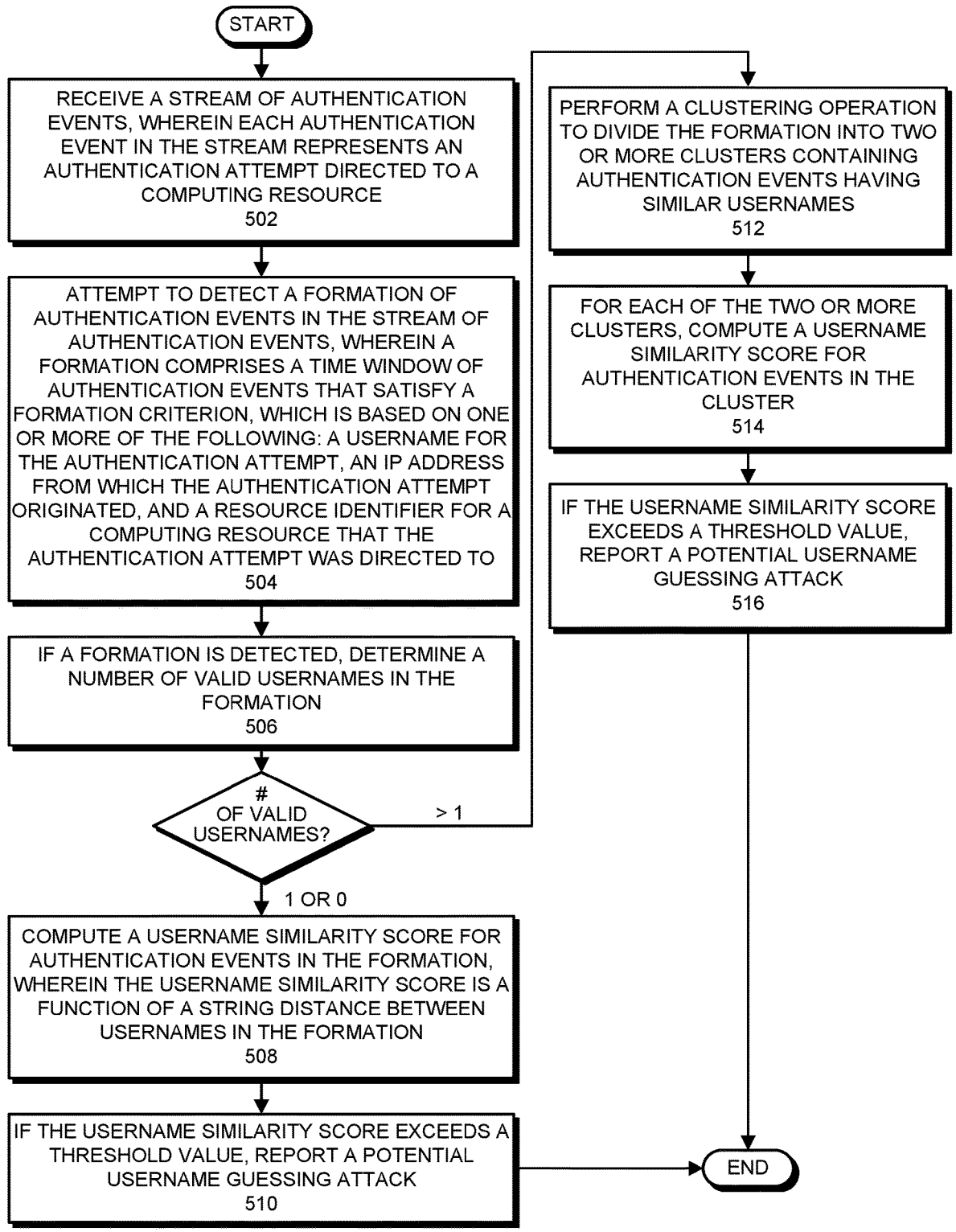
FIG. 5 presents a higher-level flow chart illustrating the process of detecting guided username guessing attacks in accordance with the disclosed embodiments.

FIG. 5 presents a higher-level flow chart illustrating the process of detecting username guessing attacks in accordance with the disclosed embodiments. During operation, the system receives a stream of authentication events, wherein each authentication event in the stream represents an authentication attempt directed to a computing resource (step 502). Next, the system attempts to detect a formation of authentication events in the stream of authentication events, wherein a formation comprises a time window of authentication events that satisfy a formation criterion, which is based on one or more of the following: a username for the authentication attempt, an IP address from which the authentication attempt originated, and a resource identifier for a computing resource that the authentication attempt was directed to (step 504). If a formation is detected, the system determines a number of valid usernames in the formation (step 506).

Next, if the number of valid usernames is one or less, the system computes a username similarity score for authentication events in the formation, wherein the username similarity score is a function of a string distance between usernames in the formation (step 508). If the username similarity score exceeds a threshold value, the system reports a potential username guessing attack (step 510).

On the other hand, if the number of valid usernames is greater than one, the system performs a clustering operation to divide the formation into two or more clusters containing authentication events having similar usernames (step 512). Then, for each of the two or more clusters, the system computes a username similarity score for authentication events in the cluster (step 514). If the username similarity score exceeds a threshold value, the system reports a potential username guessing attack (step 516).

Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The foregoing descriptions of embodiments have been presented for purposes of illustration and description only. They are not intended to be exhaustive or to limit the present description to the forms disclosed. Accordingly, many modifications and variations will be apparent to practitioners skilled in the art. Additionally, the above disclosure is not intended to limit the present description. The scope of the present description is defined by the appended claims.

What is claimed is:

1. A method for detecting a username guessing attack, comprising:
   receiving a stream of multiple authentication events, wherein each authentication event in the stream represents an authentication attempt directed to a computing resource;
   attempting to detect a formation of authentication events in the stream of multiple authentication events, wherein the formation comprises a time window of authentication events that satisfy formation criteria that include a username for the authentication attempt, an Internet Protocol (IP) address from which the authentication attempt originated, and a resource identifier for the computing resource to which the authentication attempt was directed;
   when the formation is detected, determining a number of valid usernames in the formation; and
   when the number of valid usernames is one or less:
   computing a username similarity score for authentication events in the formation, wherein the username similarity score is a function of a string distance between usernames in the formation, and when the username similarity score exceeds a threshold value, reporting a potential username guessing attack.

2. The method of claim 1, wherein the formation criteria further include one or more of the following:
   a number of authentication events in the formation originate from a new IP address, and are associated with different usernames; and
   a number of authentication events in the formation are directed to a common computing resource.

3. The method of claim 1, wherein when the username similarity score exceeds the threshold value, in addition to reporting the potential username guessing attack, the method additionally comprises enforcing a second authentication factor for an account associated with the formation.

4. The method of claim 1, wherein each authentication event in the multiple stream of authentication events is represented by a data structure, which includes at least one or more of the following attributes:
   the username for the authentication attempt;
   the IP address from which the authentication attempt originated;
   the resource identifier for the computing resource that the authentication attempt was directed to;
   a status of the authentication attempt; and
   a time of the authentication attempt.

5. The method of claim 1, wherein when the number of valid usernames is greater than one, the method further comprises:

performing a clustering operation to divide the formation into two or more clusters containing authentication events having similar usernames; and for each of the two or more clusters, computing a second username similarity score for authentication events in the cluster, and when the second username similarity score exceeds a second threshold value, reporting the potential username guessing attack.

6. The method of claim 5, wherein performing the clustering operation involves using tri-point clustering.

7. The method of claim 1, wherein the method is performed by an authentication mechanism in a single sign-on system, which facilitates authentication for multiple computational resources.

8. The method of claim 1, wherein receiving the stream of multiple authentication events involves converting each authentication event in the stream into a rule comprising attribute-value pairs.

9. The method of claim 8, wherein after each authentication event is converted into the rule, the rule is stored in a rules database.

10. The method of claim 1, wherein the method uses one or more formation detectors that execute in parallel while attempting to detect the formation of authentication events, and performing other operations to detect a username guessing attack.

11. A non-transitory, computer-readable storage medium storing instructions that when executed by a computer cause the computer to perform a method for detecting a username guessing attack, the method comprising:

receiving a stream of multiple authentication events, wherein each authentication event in the stream represents an authentication attempt directed to a computing resource;

attempting to detect a formation of authentication events in the stream of multiple authentication events, wherein the formation comprises a time window of authentication events that satisfy formation criteria that include a username for the authentication attempt, an Internet Protocol (IP) address from which the authentication attempt originated, and a resource identifier for the computing resource to which the authentication attempt was directed;

when the formation is detected, determining a number of valid usernames in the formation; and when the number of valid usernames is one or less:

computing a username similarity score for authentication events in the formation, wherein the username similarity score is a function of a string distance between usernames in the formation, and when the username similarity score exceeds a threshold value, reporting a potential username guessing attack.

12. The non-transitory, computer-readable storage medium of claim 11, wherein the formation criteria further include one or more of the following:

a number of authentication events in the formation originate from a new IP address, and are associated with different usernames; and a number of authentication events in the formation are directed to a common computing resource.

13. The non-transitory, computer-readable storage medium of claim 11, wherein when the username similarity score exceeds the threshold value, in addition to reporting the potential username guessing attack, the method additionally comprises enforcing a second authentication factor for an account associated with the formation.

14. The non-transitory, computer-readable storage medium of claim 11, wherein each authentication event in the multiple stream of authentication events is represented by a data structure, which includes at least one or more of the following attributes:

the username for the authentication attempt;

the IP address from which the authentication attempt originated;

the resource identifier for the computing resource that the authentication attempt was directed to;

a status of the authentication attempt; and a time of the authentication attempt.

15. The non-transitory, computer-readable storage medium of claim 11, wherein when the number of valid usernames is greater than one, the method further comprises:

performing a clustering operation to divide the formation into two or more clusters containing authentication events having similar usernames; and for each of the two or more clusters, computing a second username similarity score for authentication events in the cluster, and when the second username similarity score exceeds a second threshold value, reporting the potential username guessing attack.

16. The non-transitory, computer-readable storage medium of claim 11, wherein the method is performed by an authentication mechanism in a single sign-on system, which facilitates authentication for multiple computational resources.

17. The non-transitory, computer-readable storage medium of claim 11, wherein receiving the stream of multiple authentication events involves converting each authentication event in the stream into a rule comprising attribute-value pairs.

18. The non-transitory, computer-readable storage medium of claim 17, wherein after each authentication event is converted into the rule, the rule is stored in a rules database.

19. The non-transitory, computer-readable storage medium of claim 11, wherein the method uses one or more formation detectors that execute in parallel while attempting to detect the formation of authentication events, and performing other operations to detect a username guessing attack.

20. A system that detects a username guessing attack, comprising:

at least one processor and at least one associated memory; and a detection program that executes on the at least one processor, wherein during operation, the detection program:

receives a stream of multiple authentication events, wherein each authentication event in the stream represents an authentication attempt directed to a computing resource;

attempts to detect a formation of authentication events in the stream of multiple authentication events, wherein the formation comprises a Urns window of authentication events that satisfy formation criteria that include a username for the authentication attempt, an Internet Protocol (IP) address from which the authentication attempt originated, and a resource identifier for the computing resource to which the authentication attempt was directed;

when the formation is detected, determines a number of valid usernames in the formation; and when the number of valid usernames is one or less, the detection program additionally:

computes a username similarity score for authentication events in the formation, wherein the username similarity score is a function of a string distance between usernames in the formation, and when the username similarity score exceeds a threshold 26 value, reports a potential username guessing attack.

\* \* \* \* \*